United States Patent [19]

Yamaguchi et al.

[11] Patent Number: 4,817,023
[45] Date of Patent: Mar. 28, 1989

[54] SLIDE MAGAZINE PROVIDED WITH MEMORY MEANS FOR SLIDE FILM PRINTING SYSTEM

[75] Inventors: Kiyoshi Yamaguchi; Seiichi Yamazaki; Koji Ichikawa, All of Kanagawa, Japan

[73] Assignee: Fuji Photo Film Co., Ltd., Minami-Ashigara, Japan

[21] Appl. No.: 882,537

[22] Filed: Jul. 7, 1986

Related U.S. Application Data

[63] Continuation-in-part of Ser. No. 625,311, Jun. 27, 1984, abandoned.

[30] Foreign Application Priority Data

Jul. 7, 1983 [JP] Japan ................. 58-123621

[51] Int. Cl.$^4$ ................. G03B 27/52; G05B 19/42
[52] U.S. Cl. ................. 364/525; 355/40; 353/113; 364/478
[58] Field of Search ........... 364/525, 523, 478; 355/40, 41, 75, 99, 209/3.3, 564; 414/103; 353/113, 103

[56] References Cited

U.S. PATENT DOCUMENTS

| | | | |
|---|---|---|---|
| 4,140,391 | 2/1979 | Laciak et al. | 364/525 |
| 4,148,582 | 4/1979 | DeRyke et al. | 355/64 |
| 4,251,156 | 2/1981 | Zimmermann et al. | 355/41 |
| 4,420,234 | 12/1983 | Dolejsi et al. | 364/525 |
| 4,427,292 | 1/1984 | Buchanan | 364/525 |
| 4,432,637 | 2/1984 | Baschung | 355/40 |
| 4,470,675 | 9/1984 | Di Gianfilippo et al. | 353/15 |
| 4,530,599 | 7/1985 | Kaizuma et al. | 355/75 |
| 4,592,647 | 6/1986 | Seto | 355/40 |
| 4,602,865 | 7/1986 | Yamaguchi et al. | 355/40 |
| 4,693,373 | 9/1987 | Lamb et al. | 209/3.3 |

FOREIGN PATENT DOCUMENTS

0232333 12/1984 Japan ................. 355/55

OTHER PUBLICATIONS

Mc Dermott, "AV Equipment Projects An Intelligent Image, Thanks to μP/μc-Based Designs", EDN, vol. 25, No. 20, pp. 55-58, 61≠62, 65; 11/1980.

"Slide Feeding Mechanism Associated with The Control System of a Photographic Printer", Research Disclosure, Aug. 1977, pp. 57-59.

Primary Examiner—Parshotam S. Lall
Assistant Examiner—S. A. Melnick
Attorney, Agent, or Firm—Wenderoth, Lind & Ponack

[57] ABSTRACT

A slide magazine of a slide film printing system is provided with frame members each provided with slide film chambers in which slide films are stored respectively so as to be fed successively to the printer and which are provided with addresses respectively corresponding to the slide films stored therein. The slide magazine is also provided with a memory so that printing information for the slide films in the chambers will be stored in the memory in accordance with the addresses and the memory is operatively coupled to a printer of the printing system.

4 Claims, 6 Drawing Sheets

SLIDE MAGAZINE PROVIDED WITH MEMORY MEANS FOR SLIDE FILM PRINTING SYSTEM

CROSS-REFERENCE TO RELATED APPLICATION

This application is a continuation-in-part of our prior application Ser. No. 623,311, filed on June 27, 1984, entitled "SLIDE MAGAZINE PROVIDED WITH MEMORY MEANS FOR SLIDE FILM PRINTING SYSTEM", and now abandoned.

BACKGROUND OF THE INVENTION

This invention relates to an improvement of a slide film printing system and more particularly to a magazine provided with a memory means for accommodating slide films (or mount films).

A slide film printing apparatus of a known type generally comprises a photographic printer and a magazine arranged in contact with the printer for storing and feeding slide films. The photographic printer comprises a conveying means for feeding a slide film from the magazine, a film setting table for setting the slide film from the conveyor at a proper auto-focus (hereinafter referred to merely as an "AF") position, an AF mechanism for moving the film setting table, and a printing device. The magazine is mounted on a predetermined position at one side of the printer, and in the magazine, a plurality of slide films are stacked so that the stacked slide films will be fed one by one to the conveyor in the printer towards another magazine mounted on the other side of the printer through another conveying means after a printing operation at the film setting table.

However, with the magazine of the known type, a memory means is located at a position apart from the printer and the magazine for storing printing information and AF information for the slide film to be printed and the memory means is connected to the printer and the magazine through wirings. This arrangement sometimes causes troubles for management of the memory means including a magnetic disc, paper tape or the like. Moreover, the separate arrangement of the memory means and the photographic printer requires a care for the correspondence or relationship between the printing information stored and the slide film to be printed in accordance with the information.

SUMMARY OF THE INVENTION

A basic object of the present invention is to provide a slide magazine for a film printing system for accommodating slide films which obviates defects or problems of a conventional magazine for the printing system.

Another object of this invention is to provide a slide magazine for a printing system in which a memory means for storing printing conditions and AF information for the slide film to be printed is disposed.

Still another object of this invention is to provide a slide magazine for a printing system which is integrally provided with a memory means for facilitating the easiness of conveyance thereof and eliminating extra wiring connections.

According to this invention, for achieving objects described above, there is provided a slide magazine to be mounted to a printer of a slide film printing system, the slide magazine being provided with a plurality of frame members each comprising a plurality of chambers for respectively storing slide films. A memory means is disposed in the slide magazine so that printing informations for the slide films in the chambers will be stored in the memory means in accordance with respective addresses. Each address corresponds to a respective slide film chamber having slide films stored therein, the memory means is also connected to a unit arranged externally of the magazine.

Particularly, the memory means comprises a photo-coupler connected to the unit arranged externally of the printer, a serial input-output unit connected to the photo-coupler, a central processing unit connected to the serial input-output device, a read only memory connected through a bus line to the central processing unit for storing a program for processing information regarding a slide film to be printed, and a memory operatively connected to the central processing unit for storing information in accordance with the program.

The nature, principle and utility of the invention will become more apparent from the following detailed description when read in conjunction with the accompanying drawings.

DETAILED DESCRIPTION OF THE INVENTION

Figure 1:
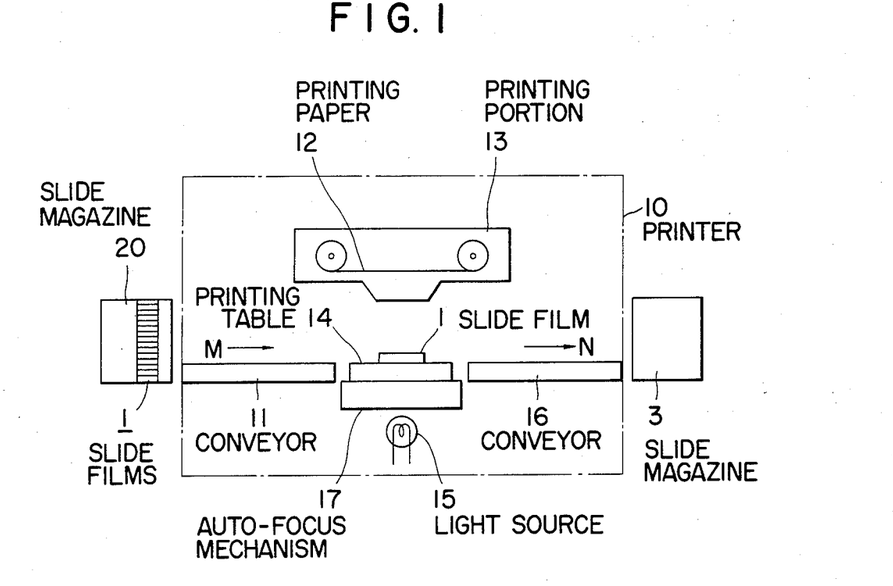
FIG. 1 is a schematic diagram showing a printing system to which a slide magazine according to this invention is applied.
Figure 2:
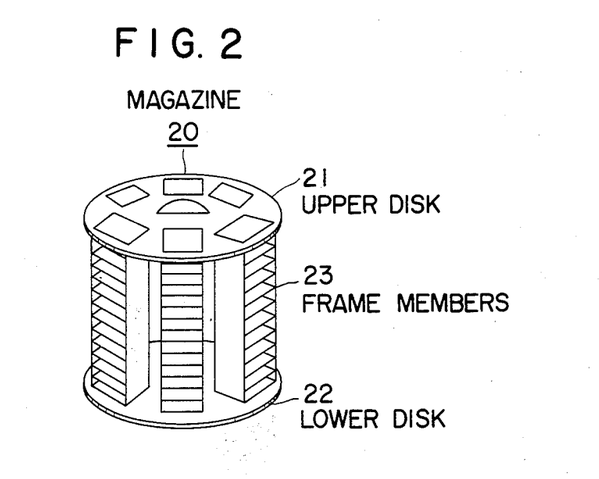
FIG. 2 is a perspective view of an example of the slide magazine shown in FIG. 1.
Figures 3A, 3B:
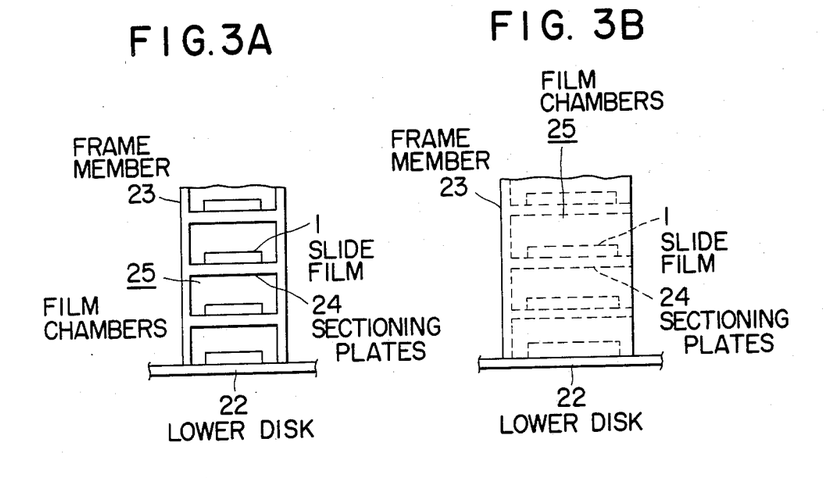
FIGS. 3A and 3B are front and side views, respectively, partially broken away, of the slide magazine including slide films shown in FIG. 2.

FIG. 1 is a schematic view showing the general arrangement of a slide film printing system including a photographic printer 10 and a slide magazine 20 according to this invention. Referring to FIG. 1, on a predetermined portion on one side of the printer 10 is mounted the slide magazine 20 in which a plurality of slide films 1 are vertically stored so that the slide films 1 can be fed one by one into the other slide magazine 3 attached on the other side of the printer 10 after the printing operation in the photographic printer 10. The photographic printer 10 comprises a conveyor 11 for conveying the slide films 1 one by one from the slide magazine 20 in a direction M, a printing table 14 on which the slide film 1 fed by the conveyor 11 is set and subjected to the focus adjustment, a printing portion 13 at which an image formed on the slide film 1 is printed on a rolled photographic printing paper 12, an auto-focus (AF) mechanism 17 for vertically shifting the printing table 14 for setting the slide film 1 at the focused position, a light source 15 disposed directly below the AF mechanism 17, and a conveyor 16 for conveying a printed slide film 1 in a direction N towards a magazine 3. The slide magazine 20 which can be used for the photographic printer 10 of the type described above is shown in FIG. 2, FIG. 3A and FIG. 3B. As shown in FIG. 2, the slide magazine 20 comprises upper and lower discs 21 and 22 which are connected through a plurality of parallel frame members 23 each having a rectangular cross section. The frame member 23 is divided into several parts by a plurality of sectioning plates 24 so as to define film chambers 25 by the sectioning plates 24 and the side wall of the frame member 23. One slide film 1 can be stored horizontally in one film chamber 25 as shown in FIGS. 3A and 3B.

After the slide magazine 20 of the type described above is mounted on the photographic printer 10, the slide films 1 stored therein are taken out therefrom and conveyed one by one to the printing table 14 through the conveyor 11. The slide film 1 fed on the printing table 14 is then subjected to the positional adjustment, and at the same time, the AF mechanism 17 is operated so as to vertically move the printing table 14 so that the picture image on the slide film 1 can be clearly focused on the rolled photographic printing paper 12 by the light from the light source 15. Thus, the printing operation can be performed with a suitable exposure controlled by an exposure control circuit, not shown. After this printing operation, the slide film 1 is conveyed from the printing table 14 towards the magazine 3 for storing the processed films through the conveyor 16.

Figure 4:
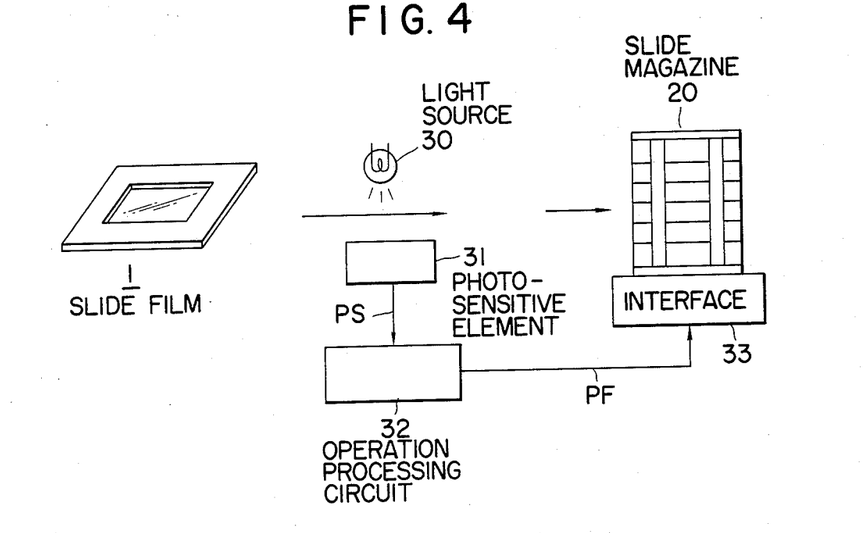
FIG. 4 is an illustration showing process for storing information of the slide film in the slide magazine shown in FIG. 2.

The slide magazine 20 according to this invention comprises the frame members 23 each consisting of a plurality of film chambers 25, and a memory means for storing necessary information and disposed in the slide magazine 20 to preliminarily record the printing information such as the AF information and the printing condition of the slide film 1 to thereby transfer the magazine 20 together with the printing information of the slide film 1. The process for storing the printing conditions in the memory means disposed in the slide magazine 20 is generally performed by a pre-processing system schematically illustrated in FIG. 4. Referring to FIG. 4, when the slide film 1 to be stored in the magazine 20 passes a space between a light source 30 and a photo-sensitive element 31 sensing light from the light source 30, the AF information and the printing conditions are operated by an operation processing circuit 32 on the basis of a signal PS representing a light amount from the photosensitive element 31, and the operated results PF are in order stored in the memory of the slide magazine 20 through an interface 33 in accordance with the addresses of the slide films 1, the addresses being respectively assigned to the film chambers with a one to one correspondence.

Figure 5A:
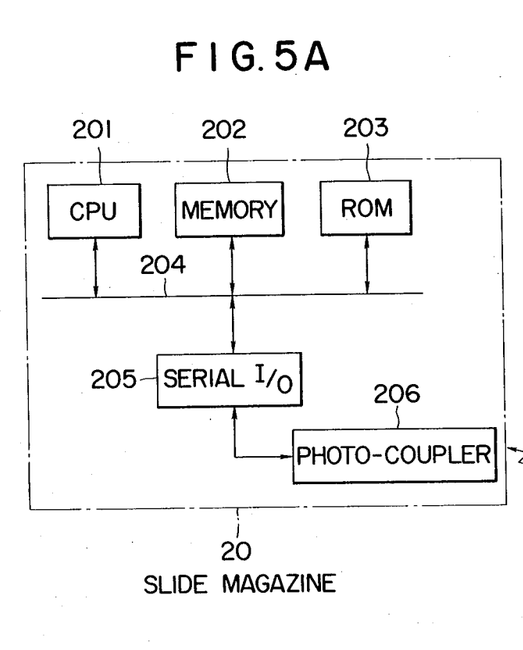
FIGS. 5A and 5B are block diagrams showing inner constructions or circuits of the magazine and the printer, respectively.

The memory means in the slide magazine 20 is for example composed of the circuit means as shown in FIG. 5A, in which the information transferred through a photo-coupler fitted in the interface 33 is received by a photo-coupler 206 on the magazine side. A receiving signal is transmitted from the photo-coupler 206 and inputted into a serial input-output unit 205, and finally, the information is stored in the memory 202 through a bus line 204 and a central processing unit (CPU) 201.

The CPU 201 is connected through the bus line 204 to a read only memory (ROM) 203 which stores a program and the information is stored successively in the memory 202 in accordance with the program.

Figure 6:
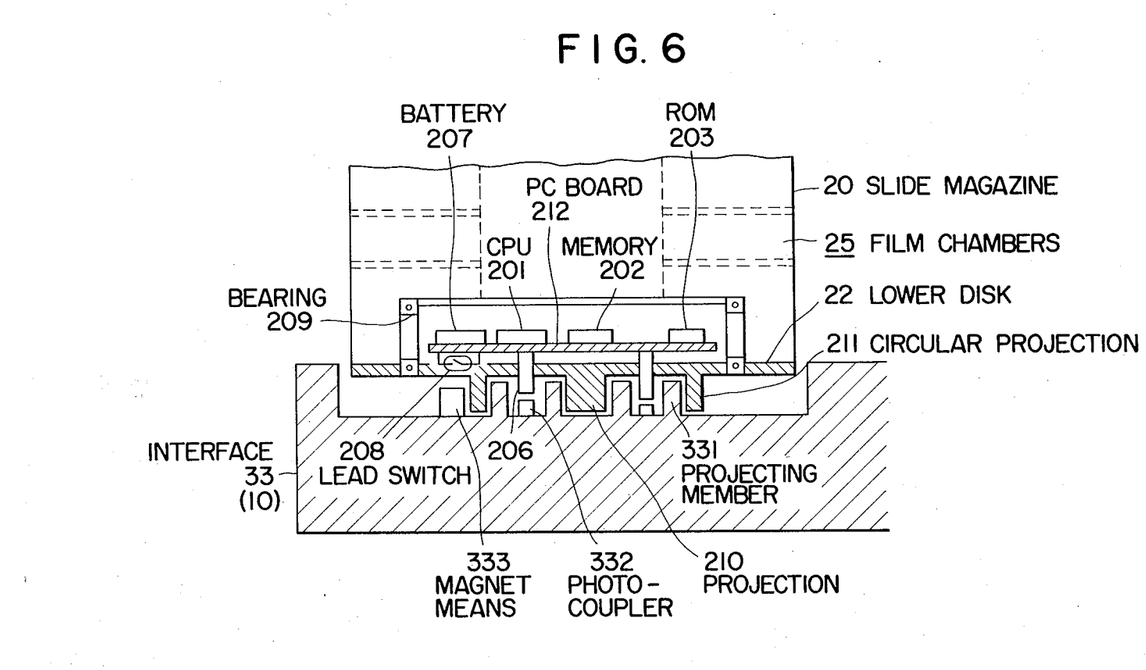
FIG. 6 is a partial sectional view showing the mounting portion of the slide magazine and an interface facing thereto.

The interconnection between the slide magazine 20 and the interface 33 is performed by a mechanism shown in FIG. 6, in which a vertical projecting member 331 of double circular shape is provided on the upper flat surface of the interface 33 and a photo-coupler 332 is fitted in the groove space of the double-circular projection 331. A magnet means 333 is located outside the projecting member 331. A projection 210 having a shape suitable for engagement with the projecting member 331 is provided at the central portion of the lower disk 22 of the magazine 20 and a circular projection 221 is also provided on the lower disk 22. The projection 211 has a diameter so that it substantially contacts the outer surface of the projecting member 331. The photo-coupler 206 is disposed at a position facing the photo-coupler 332 between the projections 210 and 211. The photo-coupler 206 is attached to a printed-circuit (PC) board 212 arranged in parallel with the lower disk 22 at a lower portion of the frame member 23, and on the PC board 212 are mounted the CPU 201, memory 202, and ROM 203, as well as a battery 207 used as a power source for these elements. A lead switch 208 magnetically operated by the magnet means 333 is also arranged on the PC board 212 at a position opposing the magnet means 333 so that the element such as CPU 201 is operated by the power supply from the battery 207 when the lead switch 208 is switched "ON". The voltage of the battery 208 is always supplied to the memory 202 regardless of the condition of the lead switch 208 so as not to erase the printing information. In addition, the optical connection between the slide magazine 20 and the photo-couplers 206 and 332 facilitates durability in comparison with mechanical connection of a connector, and moreover, it is desireable to secure these elements from the viewpoint of operational stability. Since the slide magazine 20 comprises a plurality of the frame members 23 each provided with a plurality of the film chambers 25 in which the slide films 1 are respectively stored, the PC board 212 is separated from the main body of the magazine 20 through a bearing 209 so as to thereby freely rotate the frame side of the magazine 20 with respect to the connecting portion of the interface 33 to the slide magazine 20. According to this construction, signals to and from the magazine 20 can be treated by the stationary construction and the position of the film chambers 25 can freely be rotated by the rotating mechanism described above.

Figure 5B:
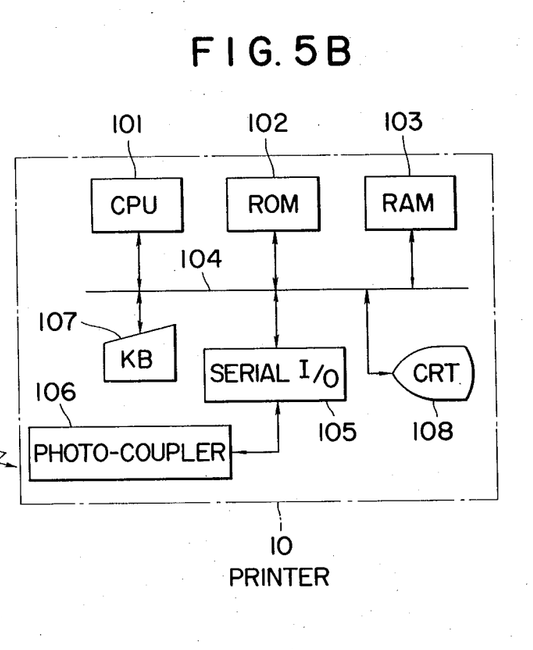

The interconnection between the interface33 and the slide magazine 20 will also be referred to for the interconnection between the slide magazine 20 and the photographic printer 10, which is shown in FIG. 5B by a circuit block diagram.

Referring to FIG. 5B, the photographic printer 10 includes a CPU 101, a ROM 102 and a random access memory (RAM) 103 which are respectively interconnected through bus lines 104. A signal received by a photo-coupler 106 is stored in the RAM 103 through a serial input-output unit 105, and an indication signal is inputted into the CPU 101 from a keyboard 107 operated by an operator. The content of the RAM 103 and the operation information can be displayed on a display unit 108 such as a cathode ray tube (CRT).

Figure 7:
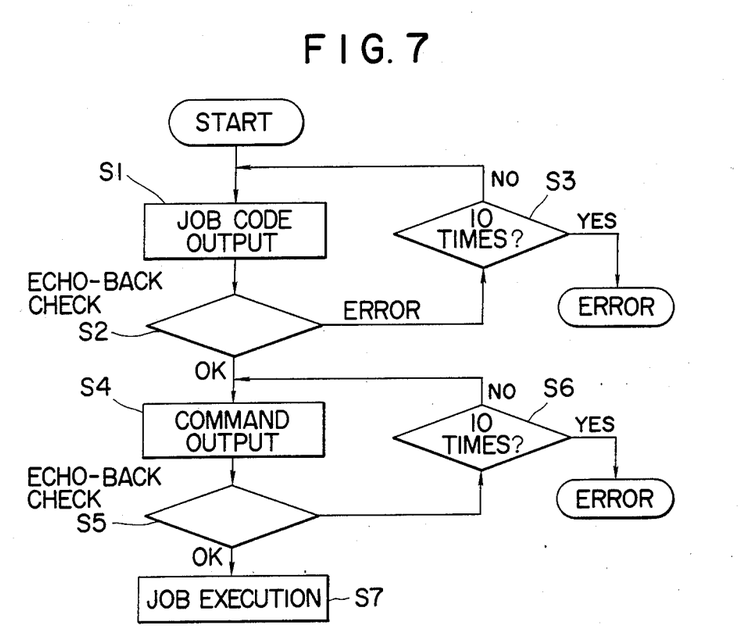
FIG. 7 is a flow chart showing the operation of the CPU 201 and explaining the transfer of the printing information between the slide magazine and the photographic printer.

The process between the photographic printer 10 and the memory 202 according to the CPU 201 in the magazine 20 will be performed in accordance with a flow chart shown in FIG. 7. In a case where it is required to transfer the printing information stored in the memory 202 in the slide magazine 20 to the photographic printer 10, a job code is transferred to the printer side from the CPU 201 through the serial input-output unit 205 and the photo-coupler 206 (Step S1), information regarding the job code is discriminated by the CPU 101 on the printer side through the serial input-output unit 105, and an echo-back is returned to the magazine side through the same elements as described above. The echo-back is checked by the CPU 201 (Step S2) and the check of the echo-back is repeated nine times (Step S3) in the case where an error exists. In the case of an echo-back "OK" determination, a command regarding the printing condition or AF information is read out from the memory 202 by the CPU 201 and is transferred to the printer side (Step S4) through the elements described before. The transferred command is read out by the CPU 101 and the echo-back therefor is returned to the magazine side to check the echo-back by the CPU 201 (Step S5). This echo-back check is done nine times (Step S6), and in case of an "OK" determination, data is transferred to the CPU 101 to carry out the execution of the job (Step S7) and the photographic printer 10 performs the printing operation of the slide film 1 in accordance with the printing condition and the AF information. As printing information, the numbers of printing papers, order number, amendment or correction information, or the like in addition to the printing condition and the AF information mentioned hereinbefore can be used, but it will of course be understood that all of these are not necessarily stored in the memory.

Figures 8, 9:
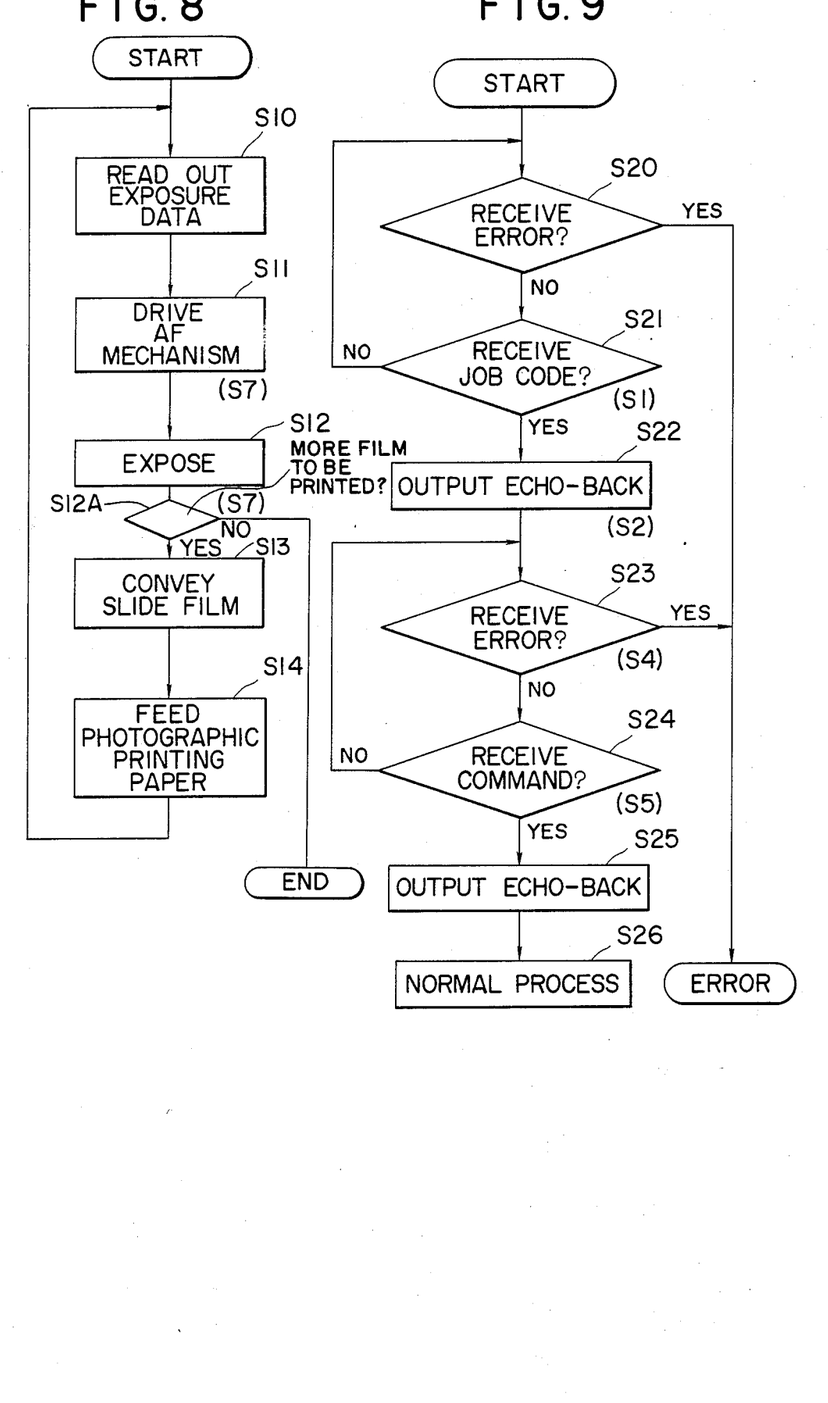
FIG. 8 is a flow chart showing the exposing operation of the photographic printer.
FIG. 9 is a flow chart showing the operation of the CPU 101 corresponding to FIG. 7.

A flow chart of FIG. 8 shows an exposing operation of the photographic printer 10 and a flow chart of FIG. 9 shows a reading out operation of the CPU 101 corresponding to FIG. 7. In FIGS. 8 and 9, step numbers with parentheses respectively correspond to the step numbers S1, S2, S4, S5 and S7 in FIG. 7.

The CPU 101 first reads out an exposure data for photographic printing (Step S10) and then drives the AF mechanism 17 as described above (Step S11). At this state, the CPU 101 exposes an image of the slide film 1 on the photographic printing paper 12 through the light source 15 (Step S12). After this printing operation, a determination is made in step 12A as to whether there is more film to be printed and if so, the CPU 101 conveys a next slide film to be printed on the AF mechanism 17 through the conveyor 11 as well as ejecting the printed slide film 1 to the slide magazine 3 through the conveyor 16 (Step S13), and feeds the photographic printing paper 12 for next printing operation (Step S14). The above Steps S11 and S12 correspond to the step S7 in FIG. 7. Further, the CPU 101 executes the operation as shown in FIG. 9 for reading out the exposure data transmitted from the slide magazine 20. In other words, the CPU 101 decides whether the error and the job code from the slide magazine 20 are received or not (Steps S20 and S21), and outputs the echo-back in a case where the error is not received at the Step S20 and the job code exists at the Step S21 (Step S22). After output of the echo-back, the CPU 101 further decides whether the error and the job code from the slide magazine 20 are received or not (Steps S23 and S24). The CPU 101 outputs the echo-back in a case where the error is not received at the Step S23 and the job code exists at the Step S24 (Step S25), and then performs the normal process (Step S26).

Figure 10:
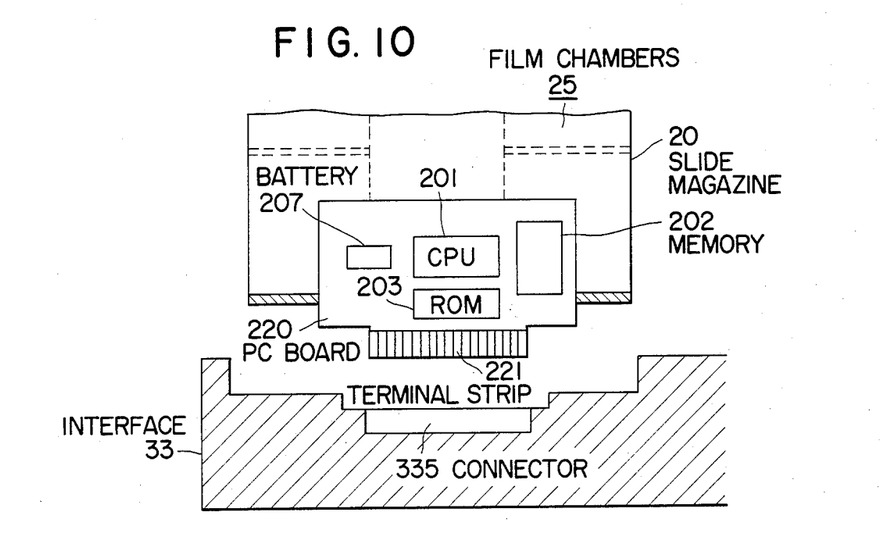
FIG. 10 is a partial sectional view showing another example similar to that shown in FIG. 6.

In the embodiment described hereinabove, although the transfer of the information between the slide magazine 20 and the interface 33 or photographic printer 10 is carried out through the photo-coupler, this information transferring process may be done by a unit shown in FIG. 10, in which a PC board 220 is vertically located below the slide magazine 20, and the CPU 201, the memory 202, the ROM 203 and the battery 207 are mounted on the PC board 220. A terminal strip 221 of the PC board 220 is inserted into a connector 335 to thereby transfer the information through an electroconductive circuit. In FIG. 10, although the PC board 220 is integrally constructed with the slide magazine 20, in this case, it is necessary to fit the PC board 220 into the connector 335 of the interface 33 so as not to be rotated and so as to rotate the frame side of the slide magazine 20.

According to this invention, as described hereinabove, since the slide magazine is itself provided with the memory means and stored the printing condition and the AF information of the slide film to be stored in the magazine, the printing information regarding the slide film can be carried together with the magazine integrally. This advantage can eliminate wiring connections with respect to the printer and management of a memory unit such as paper tape or magnetic disc in addition to the elimination of attention to the correspondence between the slide film to be used and the printing information therefor, which can obviate troublesome problems in the operation of the printing systems.

It will be apparent that many modifications and adaptations of the invention will become apparent to those skilled in the art and it is intended to encompass such obvious modifications and changes in the scope of the claims appended hereto.

What is claimed is:

1. In a slide magazine to be mounted to a printer of a slide film printing system, said slide magazine being provided with a plurality of chambers for respectively storing slide films, the improvement in which:
 a slide memory means is disposed in said slide magazine;
 wherein said chambers have addresses in said memory means respectively corresponding to the slide films stored therein;
 wherein printing information for the slide films in said chambers are stored in said memory means in accordance with said addresses, respectively;
 wherein said memory means is connected to said printer;
 wherein said printing information stored in said memory means is used in the printing of the slide film.

2. A slide magazine according to claim 1, wherein said memory comprises: a photo-coupler connected to said printer, a serial input-output unit connected to said photo-coupler, a central processing unit connected to said serial input-output device, a read only memory for storing a program for processing information regarding said slide films to be printed, and a memory connected to said central processing unit for storing information in accordance with said program.

3. A slide magazine according to claim 2, wherein said memory means is located on a printed circuit board located at a lower portion of said plurality of frame members in said slide magazine.

4. A slide magazine according to claim 1, wherein said memory means comprises: an electro-conductive connector connected to said printer, a serial input-output unit connected to said electro-conductive connector, a central processing unit connected to said serial input-output device, a read only memory connected through a bus line to said central processing unit for storing a program for processing information regarding said slide films to be printed, and a memory connected to said central processing unit for storing information in accordance with said paragraph.

* * * * *